(12) United States Patent
Jayaraman et al.

(10) Patent No.: US 11,520,516 B1
(45) Date of Patent: Dec. 6, 2022

(54) OPTIMIZING PERFORMANCE FOR SYNCHRONOUS WORKLOADS

(71) Applicant: Portworx, Inc., Los Altos, CA (US)

(72) Inventors: Vinod Jayaraman, San Francisco, CA (US); Prabir Paul, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 3 days.

(21) Appl. No.: 17/185,772

(22) Filed: Feb. 25, 2021

(51) Int. Cl.
*G06F 11/00* (2006.01)
*G06F 3/06* (2006.01)
*G06F 12/0804* (2016.01)
*G06F 9/455* (2018.01)

(52) U.S. Cl.
CPC .............. *G06F 3/065* (2013.01); *G06F 3/067* (2013.01); *G06F 3/0619* (2013.01); *G06F 3/0659* (2013.01); *G06F 12/0804* (2013.01); *G06F 9/45533* (2013.01); *G06F 2212/1032* (2013.01)

(58) Field of Classification Search
CPC ...... G06F 3/065; G06F 3/0619; G06F 3/0659; G06F 3/067; G06F 12/0804; G06F 9/45533; G06F 2212/1032
USPC ....................................................... 714/1–57
See application file for complete search history.

(56) References Cited

U.S. PATENT DOCUMENTS

| | | |
|---|---|---|
| 6,718,427 B1 | 4/2004 | Carlson |
| 6,816,941 B1 | 11/2004 | Carlson |
| 7,089,395 B2 | 8/2006 | Jacobson |
| 7,412,583 B2 | 8/2008 | Burton |
| 7,434,017 B2 | 10/2008 | Maruyama |
| 7,613,878 B2 | 11/2009 | Mori |
| 7,617,371 B2 | 11/2009 | Fujimoto |
| 7,734,888 B1 | 6/2010 | Hamilton |
| 7,809,917 B2 | 10/2010 | Burton |
| 7,873,809 B2 | 1/2011 | Kano |
| 7,945,748 B2 | 5/2011 | Shibayama |
| 8,055,723 B2 | 11/2011 | Acedo |
| 8,086,808 B2 | 12/2011 | Ichikawa |
| 8,225,057 B1 | 7/2012 | Zheng |
| 8,230,069 B2 | 7/2012 | Korupolu |
| 8,250,327 B2 | 8/2012 | Fuji |
| 8,291,159 B2 | 10/2012 | Rajagopal |
| 8,489,845 B2 | 7/2013 | Ozaki |
| 8,495,331 B2 | 7/2013 | Matsumoto |
| 8,516,215 B2 | 8/2013 | Satoyama |
| 8,539,194 B2 | 9/2013 | Inoue |
| 8,612,679 B2 | 12/2013 | Schnapp |
| 8,612,776 B2 | 12/2013 | Hakamata |
| 8,745,354 B2 | 6/2014 | Mori |
| 8,769,235 B2 | 7/2014 | Satoyama |
| 8,775,730 B2 | 7/2014 | Inoue |

(Continued)

*Primary Examiner* — Sarai E Butler
(74) *Attorney, Agent, or Firm* — ALG Intellectual Property, LLC

(57) ABSTRACT

A synchronous write operation is decomposed into an asynchronous write operation and a separate flush operation. The payload of the write operation is sent a plurality of storage nodes hosting replicas of a virtual storage volume. The write operation is only acknowledged after the payload is stored in kernel memory in a quorum of storage nodes hosting replicas. Write operations are only flushed to persistent storage after a predetermined window of time has transpired or after a threshold number of outstanding write operations that have been acknowledged, but not yet flushed, has been reached.

20 Claims, 11 Drawing Sheets

(56) References Cited

U.S. PATENT DOCUMENTS

| | | |
|---|---|---|
| 8,862,833 B2 | 10/2014 | Noll |
| 8,863,139 B2 | 10/2014 | Kakeda |
| 8,880,810 B2 | 11/2014 | Yamamoto |
| 9,182,926 B2 | 11/2015 | Naganuma |
| 9,201,607 B2 | 12/2015 | Satoyama |
| 9,229,860 B2 | 1/2016 | Matsuzawa |
| 9,237,131 B2 | 1/2016 | Nahum |
| 9,569,245 B2 | 2/2017 | Iwamatsu |
| 9,747,036 B2 | 8/2017 | Maki |
| 9,760,290 B2 | 9/2017 | Jayaraman |
| 9,760,294 B2 | 9/2017 | Miwa |
| 10,365,980 B1 | 7/2019 | Bromling |
| 10,452,293 B2 | 10/2019 | Yamamoto |
| 10,503,441 B2 | 12/2019 | Israni et al. |
| 10,564,870 B1 | 2/2020 | Greenwood |
| 10,594,571 B2 | 3/2020 | Dippenaar |
| 10,628,088 B2 | 4/2020 | Matsushita |
| 10,628,200 B2 | 4/2020 | Hadas |
| 10,664,182 B2 | 5/2020 | Oohira |
| 10,949,125 B2 | 3/2021 | Liguori |
| 10,956,063 B2 | 3/2021 | Yamamoto |
| 2002/0087687 A1* | 7/2002 | Zaifman ............. G06F 11/0781 709/225 |
| 2002/0103889 A1 | 8/2002 | Markson |
| 2004/0068611 A1 | 4/2004 | Jacobson |
| 2006/0107016 A1 | 5/2006 | Murotani |
| 2006/0107017 A1 | 5/2006 | Serizawa |
| 2006/0212453 A1* | 9/2006 | Eshel ................. G06F 11/2046 |
| 2006/0282641 A1 | 12/2006 | Fujimoto |
| 2007/0233987 A1 | 10/2007 | Maruyama |
| 2007/0233992 A1 | 10/2007 | Sato |
| 2008/0028143 A1 | 1/2008 | Murase |
| 2008/0104345 A1* | 5/2008 | Maruyama ......... G06F 11/1466 711/162 |
| 2008/0222376 A1 | 9/2008 | Burton |
| 2009/0150639 A1 | 6/2009 | Ohata |
| 2009/0228589 A1 | 9/2009 | Korupolu |
| 2009/0240880 A1 | 9/2009 | Kawaguchi |
| 2009/0254636 A1 | 10/2009 | Acedo |
| 2010/0011185 A1 | 1/2010 | Inoue |
| 2010/0017577 A1 | 1/2010 | Fujimoto |
| 2010/0082900 A1 | 4/2010 | Murayama |
| 2010/0100604 A1 | 4/2010 | Fujiwara |
| 2010/0332882 A1 | 12/2010 | Nayak |
| 2011/0010569 A1* | 1/2011 | Obr ........................ G06F 1/30 713/340 |
| 2011/0060885 A1 | 3/2011 | Satoyama |
| 2011/0066823 A1 | 3/2011 | Ando |
| 2011/0078362 A1* | 3/2011 | Scouller ............ G06F 12/0246 703/23 |
| 2011/0161406 A1 | 6/2011 | Kakeda |
| 2011/0185135 A1 | 7/2011 | Fuji |
| 2011/0185139 A1 | 7/2011 | Inoue |
| 2011/0191537 A1 | 8/2011 | Kawaguchi |
| 2011/0252214 A1 | 10/2011 | Naganuma |
| 2011/0264868 A1 | 10/2011 | Takata |
| 2011/0276772 A1 | 11/2011 | Ohata |
| 2012/0166751 A1 | 6/2012 | Matsumoto |
| 2012/0173838 A1 | 7/2012 | Noll |
| 2012/0226885 A1 | 9/2012 | Mori |
| 2012/0311260 A1 | 12/2012 | Yamagiwa |
| 2013/0117448 A1 | 5/2013 | Nahum |
| 2013/0339781 A1* | 12/2013 | Wamorkar .......... G06F 11/2028 714/E11.073 |
| 2014/0006726 A1 | 1/2014 | Yamamoto |
| 2014/0173326 A1* | 6/2014 | Belluomini ......... G06F 16/2343 714/2 |
| 2014/0281339 A1 | 9/2014 | Satoyama |
| 2014/0372723 A1 | 12/2014 | Bobroff |
| 2015/0242132 A1* | 8/2015 | Brooker ............. G06F 12/0875 711/102 |
| 2015/0277955 A1 | 10/2015 | Iwamatsu |
| 2015/0331793 A1 | 11/2015 | Matsuzawa |
| 2016/0004476 A1 | 1/2016 | Emaru |
| 2016/0092132 A1 | 3/2016 | Hildebrand |
| 2016/0094410 A1 | 3/2016 | Anwar |
| 2016/0253114 A1 | 9/2016 | Deguchi |
| 2017/0090774 A1 | 8/2017 | Dambal |
| 2017/0220282 A1 | 8/2017 | Dambal |
| 2017/0222890 A1 | 8/2017 | Dippenaar |
| 2017/0308316 A1 | 10/2017 | Yamamoto |
| 2017/0329830 A1* | 11/2017 | Simitsis ............. G06F 16/2379 |
| 2017/0359221 A1 | 12/2017 | Hori |
| 2018/0004447 A1 | 1/2018 | Oohira |
| 2018/0075056 A1* | 3/2018 | Colgrove ........... G06F 12/0253 |
| 2019/0129740 A1 | 5/2019 | Hadas |
| 2019/0266022 A1 | 8/2019 | Israni et al. |
| 2019/0272222 A1 | 9/2019 | Wei |
| 2020/0042213 A1 | 2/2020 | Yamamoto |
| 2020/0073552 A1 | 3/2020 | Sangle |
| 2020/0104151 A1 | 4/2020 | Shibayama |
| 2020/0264956 A1 | 8/2020 | Thomas |
| 2020/0409600 A1 | 12/2020 | Liguori |
| 2021/0055872 A1* | 2/2021 | Epping ................. G06F 3/0655 |
| 2022/0092024 A1* | 3/2022 | Kavaipatti Anantharamakrishnan ................ G06F 16/128 |

\* cited by examiner

OPTIMIZING PERFORMANCE FOR SYNCHRONOUS WORKLOADS

TECHNICAL FIELD

The present disclosure relates generally to containerized applications and more specifically to containerized scalable storage applications.

DESCRIPTION OF RELATED ART

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Various embodiments of the present disclosure relate generally to methods, systems, device, and computer readable media associated with dynamic volume storage adjustment. According to various embodiments, a write request to write data to a virtual storage volume is received. The virtual storage volume has a plurality of replicas. Each replica is stored on a storage node corresponding to a different fault domain across a plurality of storage nodes in a storage node cluster. Each storage node includes one or more storage pools for storing data corresponding to the virtual storage volume. Each storage pool corresponds to one or more storage devices having storage space allocated for storing the data. The write request includes a payload. Next, the write request is transmitted to each storage node storing a replica. At each storage node storing a replica, a copy of the payload is stored in kernel memory. The write request is acknowledged only after a quorum of storage nodes has stored the payload in their respective kernel memory. Last, the payloads stored in each kernel memory is flushed to persistent storage only after a predetermined window of time has transpired or after a threshold number of outstanding write requests that have been acknowledged, but not yet flushed, has been reached.

In some embodiments, the request to write data is a synchronous write operation. In some embodiments, the synchronous write operation is decomposed into an asynchronous write operation and a separate flush operation. In some embodiments, a timer is set with the predetermined window of time and automatically resets after the timer expires. In some embodiments, a counter is incremented every time a new write request is received and acknowledged, the counter corresponding to the number of outstanding write requests that have been acknowledged but have yet to be flushed. In some embodiments, if one storage node storing a replica fails, then all write requests are flushed to persistent storage as soon as they are acknowledged regardless of whether the predetermined window of time has transpired. In some embodiments, the predetermined window of time is adjustable but has a default window size of 50 milliseconds.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
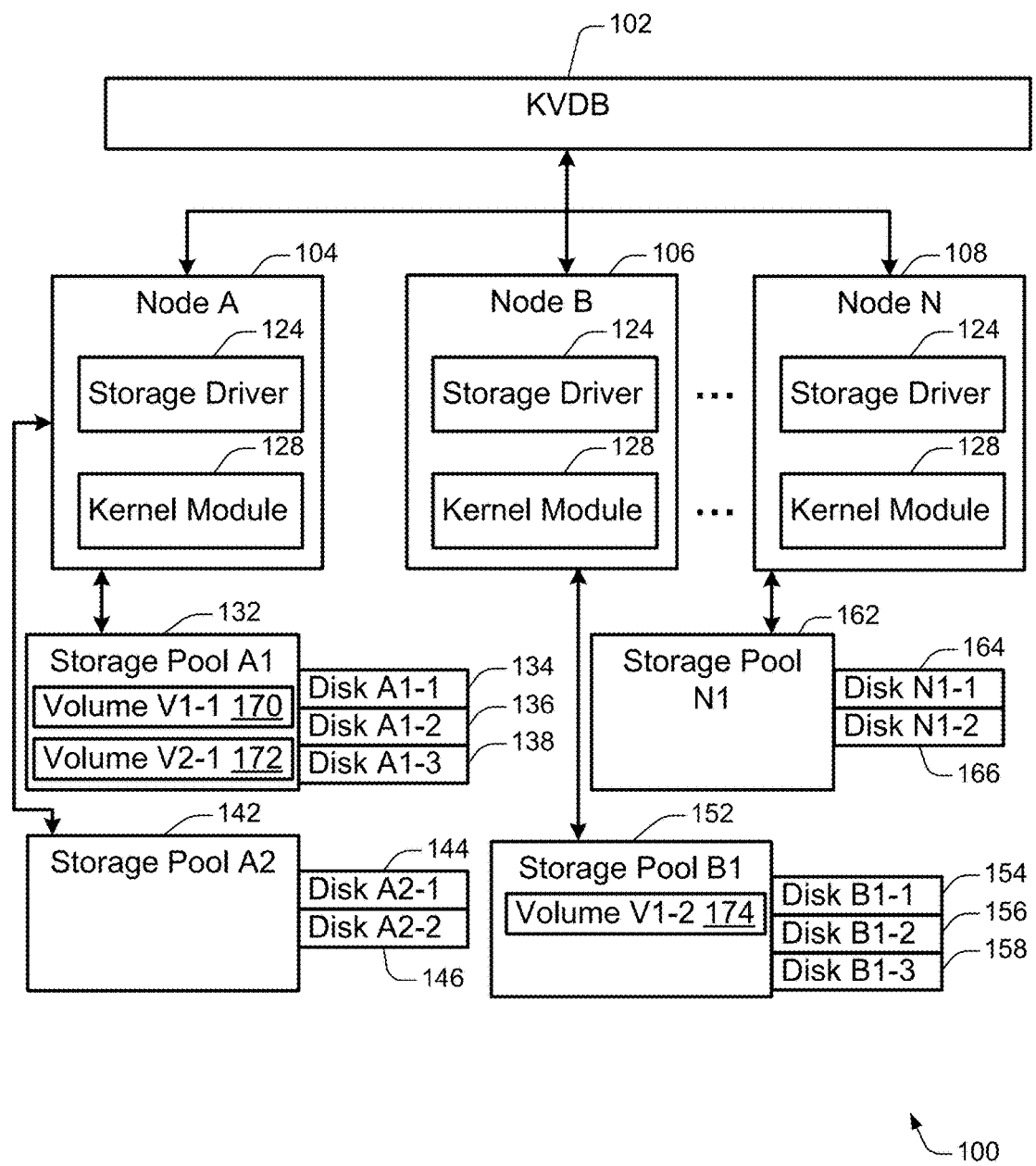
FIG. 1 illustrates an example of an arrangement of components in a distributed storage system, configured in accordance with one or more embodiments.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of particular containerized storage environments. However, it should be noted that the techniques of the present disclosure apply to a wide variety of different containerized storage environments. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

EXAMPLE EMBODIMENTS

According to various embodiments, a virtual storage volume may provide storage for one or more applications. A virtual storage volume can span one or more different physical disks and can be made accessible to potentially many different compute nodes. However, a virtual storage volume will often be mounted on a specific compute node for the purpose of avoiding conflicts and race conditions in writing data to the storage volume.

In some configurations, a virtual storage volume may be replicated in the sense that more than one copy of the data is maintained. When a virtual storage volume is replicated, an instruction to write data to the virtual storage volume is split and then applied to each of the replicas. The replication factor of a virtual storage volume identifies the number of replicas being maintained.

In some implementations, maintaining two or more replicas of a virtual storage volume can provide any of a variety of advantages. For example, requests to read data from the virtual storage volume can be divided among the different replicas, potentially reducing network traffic for the system as a whole and/or input/output (I/O) loads for individual nodes.

In some configurations, it may be necessary or desired to have synchronous write operations. For example, if a write request is received, it is immediately flushed to non-volatile or persistent storage. Synchronous write operations are required in conventional systems to guarantee transactionality. However, in various embodiments, a flush operation is the most expensive operation because it introduces serialization and write amplification. This means that a flush operation creates a barrier to stop new write operations from coming in until existing cached data makes it to disk. In addition, write operations with small block sizes can cause many metadata updates resulting in write amplification. Since database workloads are characterized by many short writes followed by frequent syncs (flushes to persistent storage), performance can be severely degraded due to flush operation inefficiency, especially with spinning media.

Techniques and mechanisms described herein optimize synchronous workloads in distributed storage systems. According to various embodiments, volumes and replicas are stored across storage nodes in a storage node cluster. Each replica is stored on a node in a different fault domain from another replica's node. Synchronous write operations are decomposed into asynchronous writes and window flushes. In some embodiments, the window flushes include coalescing adjacent sync operations within a given time window. In some embodiments, the payload of a write operation is transmitted to replica nodes across different fault domains. Once a quorum of replica nodes store the payload in kernel memory, the write operation is acknowledged by the system. Writes stored in kernel memory are then flushed after the window of time has transpired, or if a threshold number of write operations have been cached without a flush. Because write operations are only acknowledged once a quorum of replica nodes have already stored the write payload in their respective kernel memory, then data would only be lost if all nodes in the quorum fail within the given time window, which is extremely improbable.

In some configurations, it may be necessary or desired to increase the replication factor of a virtual storage volume while the virtual storage volume is in use. For example, an increased replication factor may help to accommodate an increase in I/O traffic for the virtual storage volume over time.

Techniques and mechanisms described herein facilitate the increase in virtual storage volume replication factor. According to various embodiments, the increase in a virtual storage volume's replication factor may be divided into two phases. In the transfer phase, one or more snapshots are used to iteratively copy data from the virtual storage volume to a newly added replica of the virtual storage volume. In the resynchronization phase, recently changed data is synchronized between the virtual storage volume and the newly added replica.

In some embodiments, techniques and mechanisms described herein facilitate the increase in virtual storage volume replication factor without the attendant disruption associated with conventional approaches. For example, the replication factor of a virtual storage volume may be increased without blocking access to the virtual storage volume. Thus, techniques and mechanisms described herein provide for more efficient scaling of virtual storage volumes, which allows for the more efficient usage of computing resources. Accordingly, embodiments of the claimed disclosure provide for the improved performance of the computer and distributed computing system itself.

In some implementations, techniques and mechanisms described herein may provide one or more of the following technical advantages. First, the replication factor of a volume may be increased without incurring volume downtime. Second, data may be transferred in parallel, providing for rapid increase in the replication factor. Third, data transfer speeds may be configured, providing for configurability and efficiency in the use of computing resources. Fourth, procedures described herein may be restarted in the sense that they may be resumed in place after the failure and restarting of any of the source or target replicas.

Techniques and mechanisms described herein facilitate the operation of a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, each compute node may include a storage driver configured to facilitate access between applications loaded on the compute node and one or more storage volumes mounted on the compute node. The storage driver may be implemented as a containerized application having special permissions beyond those typically accorded to containerized applications in the system, a configuration referred to herein as a privileged storage container. Techniques and mechanisms related to privileged storage containers are discussed in further detail with respect to FIG. 6.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

FIG. 1 illustrates an example of an arrangement of components in a containerized storage system 100, configured in accordance with one or more embodiments. The storage system 100 includes a clustered key-value database (KVDB) 102 in communication with a plurality of application nodes application nodes 104, 106, and 108. Each node has implemented thereon a storage driver 124 and a kernel module 128. Each node has access to zero or more storage pools such as the storage pools A1 132, A2 142, B1 152, and N1 162. Each storage pool includes zero or more virtual storage volumes such as the virtual storage volumes V1-1 170, V2-1 172, and V1-2 174. Each virtual storage volume includes storage space on one or more disks associated with the storage pool such as the disks A1-1 134, A1-2 136, A1-3 138, A2-1 144, A2-2 146, N1-1 164, N1-2 166, B1-1 154, B1-2 156, and B1-3 158.

In some embodiments, KVDB 102 is configured to serve as the single source of truth for an entire cluster. In some embodiments, KVDB 102 maintains cluster membership information as well as configuration for every volume. In some embodiments, KVDB 102 also maintains a monotonically increasing cluster version number. In such embodiments, this version number ensures update and communication order in a distributed system.

In some embodiments, KVDB 102 communicates with nodes 104, 106, and 108 solely in a control path. In such embodiments, KVDB 102 is not in the datapath for the nodes. In some embodiments, KVDB 102 is configured to be periodically snapshotted and the key-value space is also periodically saved. Thus, in such embodiments, KVDB 102 can be reconstructed in case of a disaster.

In some embodiments, each volume in the cluster has access, either via KVDB 102, via direct communication with other nodes, or via data stored in a database, to information related to the volume's mapping. In some embodiments, such information can include how many "chunks" comprise each volume. In some embodiments, each chunk represents a range of contiguous offsets. In some embodiments, each offset can belong to one chunk.

In some embodiments, each chunk may have one or more "replication sets." In some embodiments, each replication set comprises a set of nodes (or pools) which have the same data replicated. In some embodiments, data itself may be striped between chunks or within chunks. In some embodiments, the chunk size must be a multiple of the stripe size in case data is striped within a chunk.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
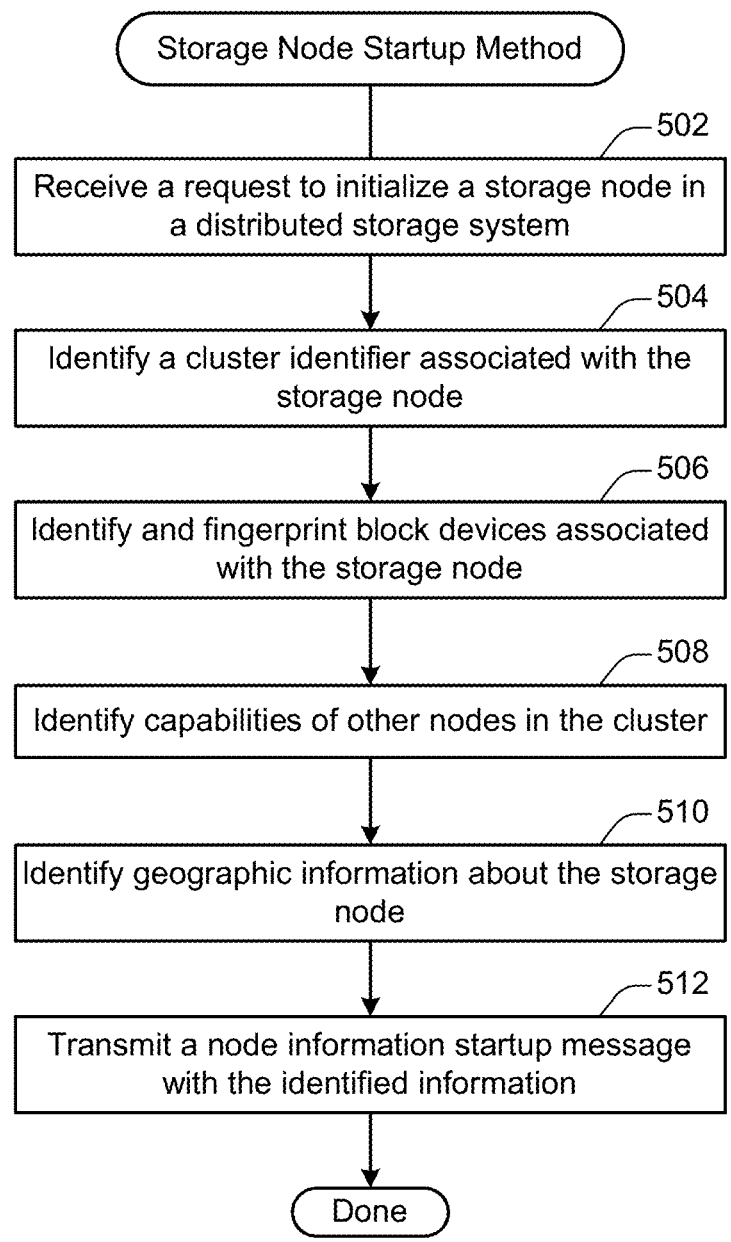
FIG. 5 illustrates a flow chart of an example of a method for starting up a storage node, in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 6.

According to various embodiments, each node may be configured to instantiate and execute one or more containerized application instance. Each node may include many components not shown in FIG. 1. These components may include hardware components, such as those discussed with respect to FIG. 5, and/or software components, such as those discussed herein.

According to various embodiments, each node may include a storage driver 124. The storage driver 124 may perform any of various types of storage-related operations for the node. For example, the storage driver 124 may facilitate the mounting or unmounting of virtual storage volumes. As another example, the storage driver 124 may facilitate data storage or retrieval requests associated with a mounted virtual storage volume. The storage driver 124 may be substantially similar or identical to the privileged storage container 616 shown in FIG. 6.

In some embodiments, each node may include a kernel module 128. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as the pool 132 may include potentially many different disks.

According to various embodiments, the virtual storage volumes 170, 172, and 174 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some implementations, each virtual storage volume may include zero or more replicas. For example, the storage volume V1-1 170 on the Node A 104 includes the replica V1-2 174 on the Node B 106. Replicating a virtual storage volume may offer any of various computing advantages. For example, each replica may be configured to respond to data read requests, so increasing the replication factor may increase read access bandwidth to the virtual storage volume. As another example, replicas may provide redundancy in the event of a software and/or hardware failure associated with the storage volume.

Figure 2:
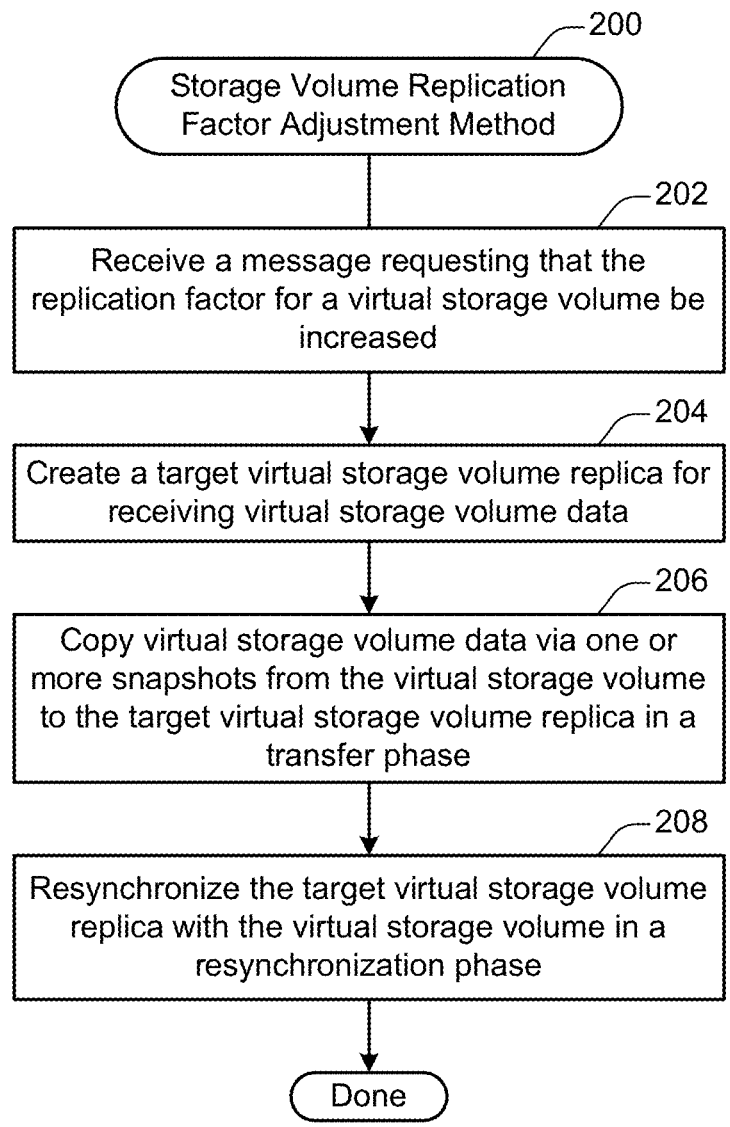
FIG. 2 illustrates an example of a storage volume replication factor adjustment method, performed in accordance with one or more embodiments.

FIG. 2 illustrates an example of a storage volume replication factor adjustment method 200, performed in accordance with one or more embodiments. According to various embodiments, the method 200 may be performed when a request is received at operation 202, to increase the replication factor for a virtual storage volume. For instance, a request may be received to increase the replication factor of the storage volume V1 shown in FIG. 1 to include an additional replica on the Node N 108.

In particular embodiments, such a request may be generated manually, for instance by a systems administrator. Alternately, such a request may be generated automatically. For instance, an application may transmit a request to increase the replication factor of a storage volume when a designated I/O threshold is reached.

According to various embodiments, various operations associated with FIG. 2 may be performed at any of several nodes, such as the Node A 104, Node B 106, and/or Node N 108 shown in FIG. 1. The coordinator may perform any or all of various command and control functions for the replicated storage volume. For example, the coordinator may transmit instructions to increase or decrease the replication factor of the storage volume. As another example, the coordinator may receive requests to write data to the storage volume and then transmit those requests to each of the replicas in order to maintain data consistency and integrity across the replicas.

In some configurations, the coordinator node 104 may be a distinct node without an attached replica of the storage volume. Alternately, the coordinator node 104 may include a replica of the storage volume. For example, in the system 100 shown in FIG. 1, the coordinator node may be implemented as a module on the Node A 104 or the Node N 106.

A target virtual storage volume replica is created for receiving virtual storage volume data at 204. The target virtual storage volume replica may be created by performing any or all of a range of suitable operations. The target virtual storage volume replica may be provisioned with a size suitable for receiving the virtual storage volume data. For example, different replicas associated with the same storage volume may be maintained at comparable sizes to facilitate data and performance consistency across the replicas.

At 206, virtual storage volume data is copied via one or more snapshots from the virtual storage volume to the target virtual storage volume replica in a transfer phase. Techniques associated with the copying of data via one or more snapshots are discussed in additional detail with respect to the method 300 shown in FIG. 3.

At 208, the target virtual storage volume replica is resynchronized with the virtual storage volume in a resynchronization phase. Techniques associated with the resynchronization of a target virtual storage volume replica with the virtual storage volume are discussed in additional detail with respect to the method 400 shown in FIG. 4.

Figure 3:
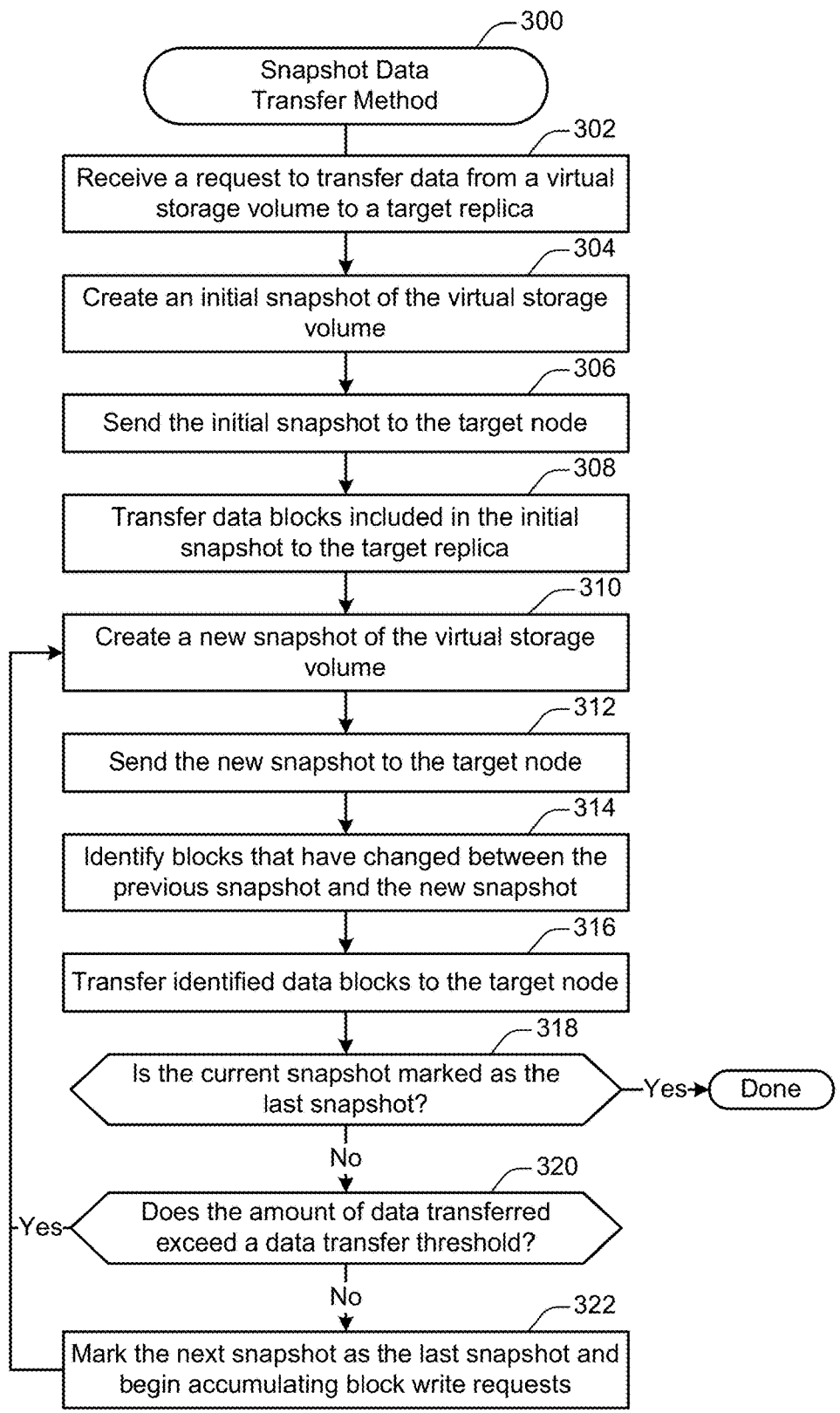
FIG. 3 illustrates an example of a method for transferring data via one or more snapshots, performed in accordance with one or more embodiments.

FIG. 3 illustrates an example of a method 300 for transferring data via one or more snapshots, performed in accordance with one or more embodiments. The method 400 may be performed at one or more components of the system 100 shown in FIG. 1.

In some embodiments, the method 300 may be initiated when a request is received at operation 302 to transfer data from a virtual storage volume to the target replica. For example, a request may be received to increase the replication factor the virtual storage volume by adding a target replica, such as a new replica for the Volume V2 on the Node N 108 shown in FIG. 1.

A new snapshot is created at operation 304. According to various embodiments, creating a new snapshot may involve constructing a list of blocks included within a snapshot at a designated point in time. For example, the storage driver may maintain a table of block identifiers and block locations to facilitate access to the data blocks. Because the volume is implemented within a copy-on-write framework, subsequent data write requests that write to the data blocks included within the snapshot will not lead to the corruption of the snapshot. Techniques for copy-on-write data management are discussed with respect to FIG. 7.

At 306, the initial snapshot is sent to the target node. In some implementations, transmitting the initial snapshot to the target node may involve sending a message with an identifier associated with the initial snapshot. In addition, the target node may receive a list of the block identifiers for blocks included in the snapshot.

308, the data blocks included in the initial snapshot are transferred to the target replica. According to various embodiments, the blocks may be transferred via any suitable transfer procedure. For example, the list of data blocks may be divided into chunks. The chunks may then be retrieved in parallel from each previously created virtual storage volume replica. When a block is retrieved, the data may be stored on the target replica. Although a block may keep the same identifier when transferred from the volume to the target replica, the location at which it is stored will be different because the target replica employs different hardware storage resources than the source volume, as discussed with respect to FIG. 1.

After transferring the data blocks included in the initial snapshot to the target replica, the target replica is synchronized with the source volume up to the point in time when the initial snapshot was captured. However, the source volume may have continued to receive data write requests after the initial snapshot was generated. Accordingly, at operation 310, a new snapshot is created.

According to various embodiments, the generation of the new snapshot may be performed in a manner substantially similar to the generation of the initial snapshot at operation 304. After the new snapshot is generated, it is sent to the target node at operation 312 in a manner substantially similar to that in which the initial snapshot is sent at operation 306.

At 314, blocks that have changed between the previous snapshot and the new snapshot are identified. According to various embodiments, the changed blocks may be identified by any suitable method. For example, block identifiers in the previous and new snapshots may be compared to identify newly added or removed blocks. In some implementations, the identification of changed blocks may be performed by a node associated with the source volume. Alternately, or additionally, the target node may identify changed or newly added blocks.

After the blocks are identified, they are transferred from the virtual storage volume to the target replica at operation 316. According to various embodiments, the transfer of the identified data blocks may be performed in a manner substantially similar to that discussed with respect to the operation 314.

At 318, a determination is made as to whether the current snapshot is marked as the last snapshot. According to various embodiments, such a marking may occur in a previous iteration at operation 322. For example, if it is determined that the amount of data transferred exceeds a designated data transfer threshold at operation 320, then the next snapshot may be marked as the last snapshot at operation 322.

In some embodiments, the procedure 300 may terminate after the processing of the last snapshot. At this point, the amount of data transferred has fallen to an acceptably low point such that the state of the target replica is relatively close to that of the other replicas in the virtual storage volume. Accordingly, the target replica may be synchronized directly via a resynchronization process as described with respect to the method 400 shown in FIG. 4 based at least in part on the block write requests accumulated at operation 322.

If the current snapshot is not marked as the last snapshot, then a determination is made at 320 as to whether the amount of data transferred at operation 316 exceeds a data transfer threshold. If so, then at least two additional iterations of the snapshot data transfer method are performed.

In some implementations, the data transfer threshold may be specified in blocks, bytes, or any suitable unit of measure. The specific value used for the data transfer threshold may be strategically determined based on any of a number of considerations, which may include, but are not limited to: a storage volume size associated with the virtual storage volume and/or an amount of data written to the virtual storage volume during a designated period of time.

When the current snapshot is marked as the last snapshot at operation 318, the next snapshot is marked as the last snapshot and subsequent data write requests received are accumulated at operation 322. According to various embodiments, marking the next snapshot as the last snapshot may involve setting any suitable indicator such that the procedure terminates after the next execution of the operation 318.

In some implementations, block write requests are received by a coordinator node and then transferred to each node that has a replica of the virtual storage volume. Accordingly, block write requests may be accumulated by including the target node in the distribution of block write requests received after the last snapshot is generated. Each block write request may include information such as data to write to disk and a location such as one or more block identifiers at which to write the data.

In particular embodiments, block write requests may be executed in a sequential manner since one block write request may modify a data block written to by a previously received block write request. Accordingly, the block write requests may be accumulated in the sense that the target node may not actually execute the block write requests until the target node is fully synchronized with the virtual storage volume. During the accumulation process, the data write requests may continue to be executed as usual by replicas of the virtual storage volume other than the target replica. The resynchronization process is discussed in further detail with respect to FIG. 4.

Figure 4:
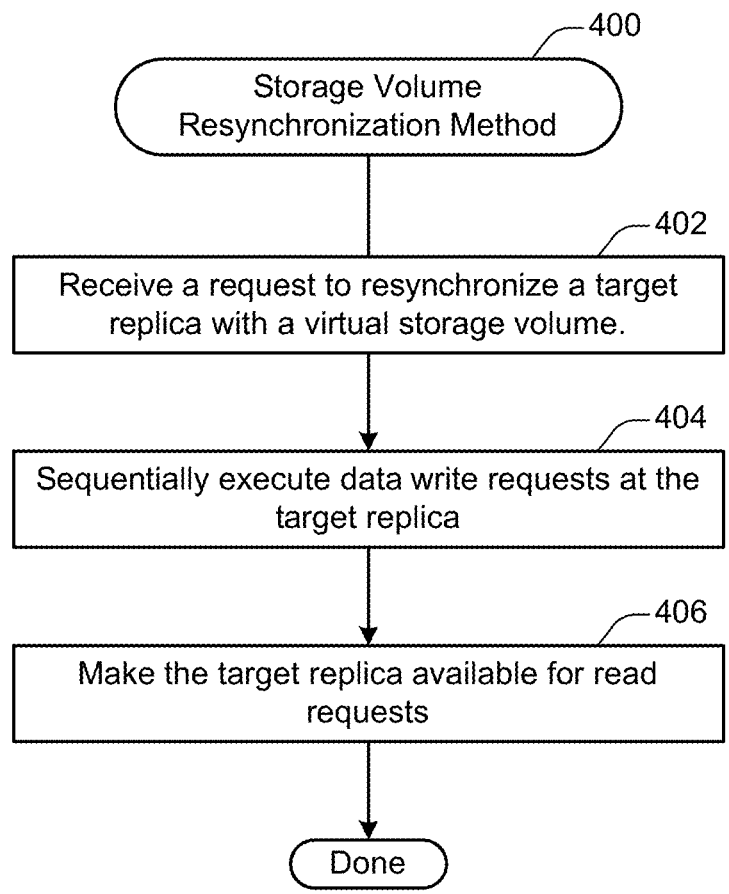
FIG. 4 illustrates an example of a method of resynchronizing a storage volume, performed in accordance with one or more embodiments.

FIG. 4 illustrates an example of a method 400 of resynchronizing a storage volume, performed in accordance with one or more embodiments. The method 400 may be performed at a replica node, such as the Node 106 shown in FIG. 1.

In some implementations, the method 400 may be performed when a request is received at 402 to resynchronize a target replica with a virtual storage volume. For example, such a request may be received as discussed at operation 208 after virtual storage volume data has been copied from the virtual storage volume to the virtual storage volume replica as described with respect to operation 206 shown in FIG. 2.

At 404, data write requests received at the target replica are executed. In some implementations, the data write requests executed at operation 404 may include those accumulated at operation 322. As discussed with respect to operation 322, accumulated data write requests may be transferred to the target replica for later execution.

According to various embodiments, the data write requests requests may be executed sequentially. For example, a particular data write requests may modify a data block that is later overwritten by a subsequent write request. Accordingly, data synchronicity across the replicas may be maintained by executing write requests in the order in which they are received.

In particular embodiments, one or more operations shown in FIG. 3 may be performed in parallel or in an order different than that shown. For example, a set of data write requests may be executed in parallel if the data blocks written by the data write requests do not overlap.

At 406, the target replica is made available for read requests. In some implementations, after the data write requests are executed, the target replica has a complete copy of the virtual storage volume and is effectively identical to the source replicas of the virtual storage volume.

FIG. 5 illustrates a flow chart of an example of a method for starting up a storage node, in accordance with embodiments of the present disclosure. Accordingly, a method, such as method 500, may be implemented to initialize a storage node when that node joins a cluster and becomes available to implement data storage operations. As will be discussed in greater detail below, such an initialization process may include the identification of data associated with various other nodes in the cluster, and such data may be used to generate a cluster hierarchy.

At 502, a request to initialize a storage node in a distributed storage system may be received. According to various embodiments, the request to initialize a new storage container node may be generated when a storage container node is activated. For instance, an administrator or configuration program may install a storage container on a server instance that includes a container engine to create a new storage container node. In various embodiments, the storage node may be included in a distributed storage system. In one example, the distributed storage system may implement storage nodes in clusters. Accordingly, the administrator or configuration program may provide a cluster identifier indicating a cluster to which the storage container node should be added. The storage container node may then communicate with the discovery service to complete the initialization.

At 504, a cluster identifier associated with the storage node may be identified. According to various embodiments, as similarly discussed above, the cluster identifier may be included with the received request. Alternately, or additionally, a cluster identifier may be identified in another way, such as by consulting a configuration file. Accordingly, the cluster identifier may be identified and retrieved based on the request, a configuration file, or from any other suitable source.

At 506, block devices associated with the storage node may be identified. In various embodiments, the block devices may be devices used to store storage volumes in a storage node. Accordingly, a particular storage node may be associated with several block devices. In various embodiments, the block devices associated with the storage node being initialized may be identified based on an input provided by the administrator, or based on a configuration file. In one example, such a configuration file may be retrieved from another node in the identified cluster.

Moreover, the identified block devices may be fingerprinted. In various embodiments, the fingerprinting may identify capabilities of various storage devices, such as drives, that may be utilized by the block devices and/or accessible to the storage node. Such storage devices may be solid state drives (SSDs), solid state hybrid drives (SSHDs), or hard disk drives (HDDs). Types of connections with such storage devices may also be identified. Examples of such connections may be any suitable version of SATA, PATA, USB, PCI, or PCIe. In some embodiments, an input/output (I/O) speed may be inferred based on the device type and connection type. In this way, it may be determined how many storage devices are available to the storage node, how much available space they have, and what type of storage devices they are, as well as how they are connected.

As discussed above, fingerprinting data may include information about underlying physical devices, such as device capacity, I/O speeds and characteristics, as well as throughput and latency characteristics. In various embodiments, such fingerprinting data may be generated based on benchmarking tools that may be implemented and run dynamically, or may have been run previously, and had results stored in a metadata server. In some embodiments, such fingerprinting data may be retrieved from a location in the cloud environment, such as the metadata server or an API server, and such data may be retrieved during the startup process. In various embodiments, such data may be retrieved from a remote location that may include technical specifications or characteristics of the underlying physical devices which may have been determined by a component manufacturer.

At 508, capabilities of other nodes in the cluster may be identified. As discussed above, such capabilities of the other nodes may identify how many storage devices are available to those storage nodes, how much available space they have, and what type of storage devices they are, as well as how they are connected. In various embodiments, capabilities of the other nodes may be one or more performance characteristics, such as I/O capabilities and speeds. Such capabilities may be determined based on devices types of underlying physical devices. For example, a particular type of device may be identified, such as SSDs, and a particular I/O speed may be identified based on the identified device type. As discussed above, capabilities may also be other characteristics of the nodes, such as a storage capacity of the node, which may be determined based on available storage in one or more underlying physical devices. It will be appreciated that storage capacity may refer to total and/or free capacity of a particular storage node, a particular storage device, and/or a particular storage volume. In various embodiments, such capabilities may be determined based on data included in a configuration file which may be propagated among nodes in the cluster. In some embodiments, the identified capabilities and other information are available as labels, as described later in the application.

At 510, geographic information about the storage node may be identified. In various embodiments, the geographic information may be particular geographical characteristics of a physical location of the storage node. For example, such geographic information may include a first identifier that identifies a rack, or other physical device unit, in which the storage node is located. The geographic information may also include a second identifier that identifies a zone, which may be a particular data center. The geographic information may further include a third identifier that identifies a region or geographical area in which the storage node is located. In various embodiments, such geographic information may be stored at each node, and may be determined based on a query issued to a metadata server. Accordingly, the query to the metadata server may be used by the metadata server to determine geographic information, and such geographic information may be provided to the storage node where it is maintained. In some embodiments, a scheduler may be implemented to maintain such geographic information. In various embodiments, geographic regions may be defined by an entity, such as an administrator, or based upon one or more designated regions, such as a time zone or other designated region such as "Eastern U.S.". While examples of a first, second, and third identifier have been described, any suitable number of identifiers may be used.

At 512, a node information startup message may be transmitted. In various embodiments, the node information startup message may include the identified information. Accordingly, the previously described information may be included in a message and may be transmitted to one or more other nodes in the cluster. In this way, the information associated with the storage node that has been initialized may be propagated to other nodes within the cluster.

Figure 6:
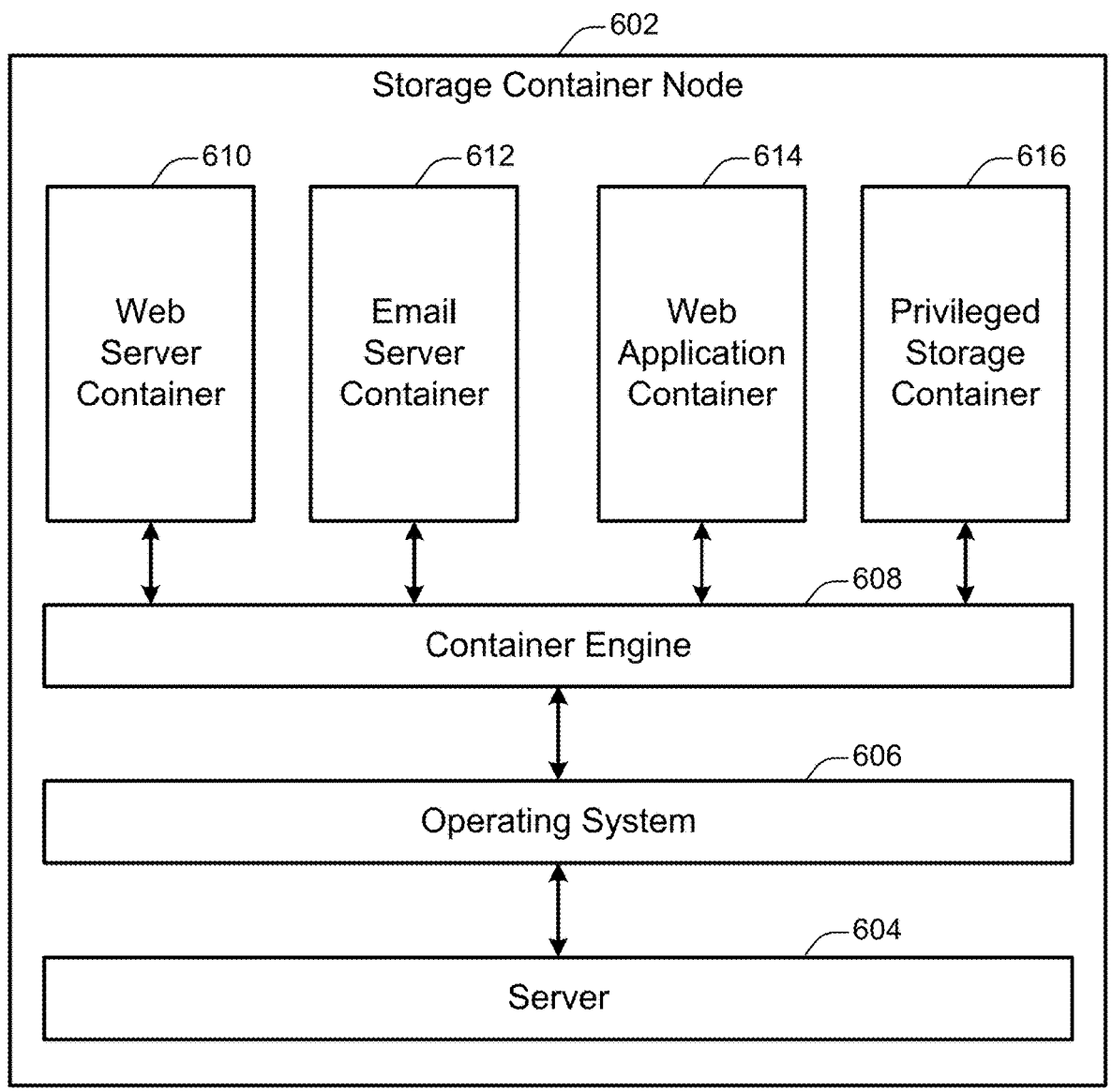
FIG. 6 illustrates an example of a storage container node, configured in accordance with one or more embodiments.

FIG. 6 illustrates an example of a storage container node 602. According to various embodiments, a storage container node may be a server configured to include a container engine and a privileged storage container. The storage container node 602 shown in FIG. 6 includes a server layer 604, an operating system layer 606, a container engine 608, a web server container 610, an email server container 612, a web application container 614, and a privileged storage container 616.

In some embodiments, the storage container node 602 may serve as an interface between storage resources available at a server instance and one or more virtual storage volumes that span more than one physical and/or virtual server. For example, the storage container node 602 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 602 may serve as an interface between storage resources available at a server instance and one or more virtual storage volumes that are replicated across more than one physical and/or virtual server. For example, the storage container node 602 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 604, the server layer is shown. According to various embodiments, the server layer may function as an interface by which the operating system 606 interacts with the server on which the storage container node 602 is implemented. A storage container node may be implemented on a virtual or physical server. For example, the storage container node 602 may be implemented at least in part on the server shown in FIG. 5. The server may include hardware such as networking components, memory, physical storage devices, and other such infrastructure. The operating system layer 606 may communicate with these devices through a standardized interface provided by the server layer 604.

At 606, the operating system layer is shown. According to various embodiments, different computing environments may employ different operating system layers. For instance, a physical or virtual server environment may include an operating system based on Microsoft Windows, Linux, or Apple's OS X. The operating system layer 606 may provide, among other functionality, a standardized interface for communicating with the server layer 604.

At 608, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 604, an operating system layer 606, and a container engine layer 608 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 602 includes the web server container 660, the email server container 612, and the web application container 614. A software container may include customized computer code configured to perform any of various tasks. For instance, the web server container 660 may provide files such as webpages to client machines upon request. The email server 612 may handle the receipt and transmission of emails as well as requests by client devices to access those emails. The web application container 614 may be configured to execute any type of web application, such as an instant messaging service, an online auction, a wiki, or a webmail service. Although that storage container node 602 shown in FIG. 6 includes three software containers, other storage container nodes may include various numbers and types of software containers.

At 616, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 610, 612, and 614 or other software containers located in different computing environments. For example, a software container may transmit a storage request to the container engine 608 via a standardized interface. The container engine 608 may transmit the storage request to the privileged storage container 616. The privileged storage container 616 may then communicate with privileged storage containers located on other storage container nodes and/or may communicate with hardware resources located at the storage container node 602 to execute the request. In some configurations, a privileged storage container is referred to herein as a scheduler agent.

In some implementations, one or more software containers may be afforded limited permissions in the computing environment in which they are located. For example, in order to facilitate a containerized software environment, the software containers 610, 612, and 614 may be restricted to communicating directly only with the container engine 608 via a standardized interface. The container engine 608 may then be responsible for relaying communications as necessary to other software containers and/or the operating system layer 606.

In some implementations, the privileged storage container 616 may be afforded additional privileges beyond those afforded to ordinary software containers. For example, the privileged storage container 616 may be allowed to communicate directly with the operating system layer 606, the server layer 604, and/or one or more physical hardware components such as physical storage devices. Providing the storage container 616 with expanded privileges may facilitate efficient storage operations such as storing, retrieving, and indexing data.

Figure 7:
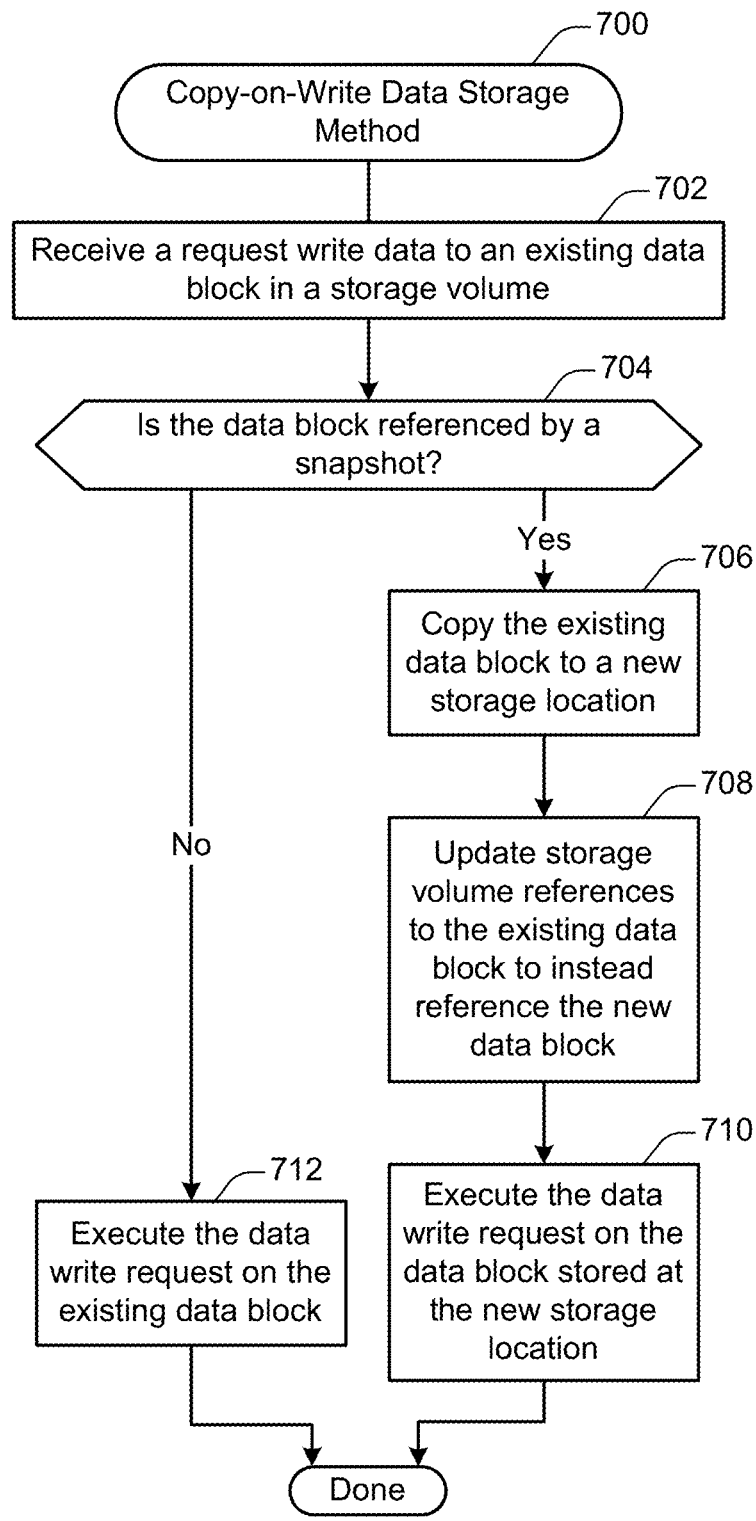
FIG. 7 illustrates an example of a method for storing data in a copy-on-write storage system, performed in accordance with one or more embodiments.

FIG. 7 illustrates an example of a method 700 for storing data in a copy-on-write storage system, performed in accordance with one or more embodiments. According to various embodiments, the method 700 may be performed in order to execute a write request that changes the state of data on a storage volume.

A request to write data to an existing data block in a storage volume is received at operation 702. In some embodiments, the request may include information such as a reference to a storage location of the data block, data to write to the data block, and a portion of the data block to be overwritten.

At 704, a determination is made as to whether the data block is referenced by a snapshot. According to various embodiments, the determination may be made at least in part by consulting a table that lists references to data blocks stored in association with the storage volume. If the data block is not referenced by a snapshot, then the data write request may be executed on the existing data block at operation 712.

If instead the data block is referenced by a snapshot, then at 706 the existing data block is copied to a new storage location. Storage volume references to the existing data block are then updated to refer to the new data block at the new storage location at operation 708. The references that are updated may exclude those that are included in a snapshot so that the snapshots continue to refer to the existing data block as it is maintained in its previous state.

At 710, the data write request is executed on the data block stored at the new storage location. According to various embodiments, executing the data write request may involve writing the data identified in the request received at 702 to the appropriate location within the data block.

Figure 8:
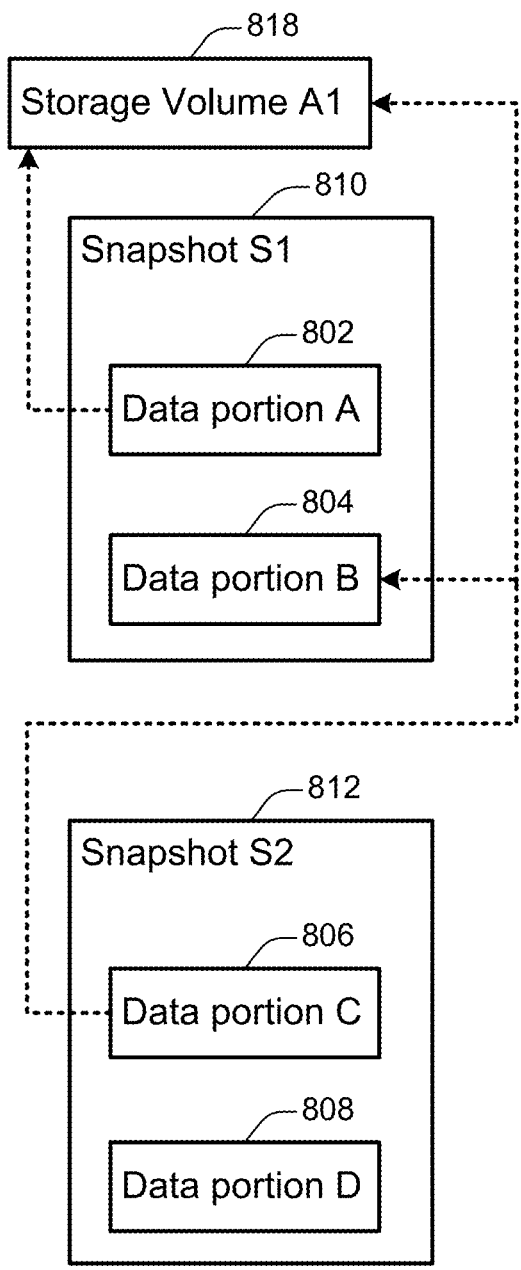
FIG. 8 illustrates an example of a configuration of data, provided in accordance with one or more embodiments.

FIG. 8 illustrates an example of a configuration of data, provided in accordance with one or more embodiments. The configuration of data shown in FIG. 8 includes Snapshot S1 810 and Snapshot S2 812, both of which correspond to Volume A1 818. The snapshots included data portions A-D 802-808.

According to various embodiments, a virtual storage volume may include some number of data blocks. Some of those data blocks may be associated with a current state of the virtual storage volume. Other data blocks may be associated with a previous state of the virtual storage volume. For instance, these other data blocks may have been overwritten by subsequent data write requests.

In some implementations, in order to perform operations such as restoring the virtual storage volume to a previous state and/or increasing a replication factor of a virtual storage volume, a request to overwrite a data block may be implemented as a copy-on-write, in which the original data is duplicated prior to executing the write request. In this way, the data block exists in both its overwritten and previous state, which facilitates the creation of snapshots capable of being used to restore the storage volume to a state at a particular point in time.

According to various embodiments, a snapshot itself may include a list of identifiers associated with data blocks associated with the virtual storage volume. Snapshots may be captured in a sequentially significant manner. In the example configuration shown in FIG. 8, the Snapshot S1 810 represents the first snapshot captured of the Volume A1 818. The data included in the Snapshot S1 810 includes two portions. The data portion A 802 includes data blocks that currently remain in Volume A1 818. Because the data blocks included in data portion A 802 are still in Volume A1 818, the Snapshot S1 810 does not store a copy of the data blocks included in data portion A 802. Instead, the data portion A 802 is stored as a set of one or more references to the data blocks as they reside in the Volume A1. For example, a reference may act as a memory pointer, which typically requires substantially less storage space than the memory to which it refers.

The data portion B 804 includes data blocks that were present in the Volume A 818 at the time the Snapshot S1 810 was captured but is no longer present in the Volume A 818 at the current point in time. A copy of this data is stored in association with the Snapshot S1 810 so that it is available if a request to restore the system to the state represented in the Snapshot S1 810 is received.

The Snapshot S2 812 represents the second snapshot captured of the Volume A1 818. The data blocks included in the Snapshot S2 812 include two portions. The data portion C 806 includes data blocks included in the Snapshot S1 810. Because the data blocks included in data portion C 806 are still in the Snapshot S1 810, the Snapshot S2 812 does not store a copy of the data blocks included in data portion C 806. Instead, the data portion C 806 is stored as a set of one or more references to the data blocks as they reside in the Snapshot S2 812.

In particular embodiments, the references in the data portion C 806 may be pointers to data blocks stored in the Snapshot S1 810 (e.g., in the data portion B 804) or may be pointers to references to data blocks stored in the storage volume A1 818. For example, some of these references may point to data blocks stored by value in the Snapshot S1 810 (i.e. in the data portion B 804) that no longer remain in the Storage Volume A1 818. As another example, other references may point to data blocks that do remain in the Storage Volume A1 818. Thus, the data portion C 806 and the data portion A 802 may include some of the same references to data blocks that remain in the storage volume A1 818.

Figure 9:
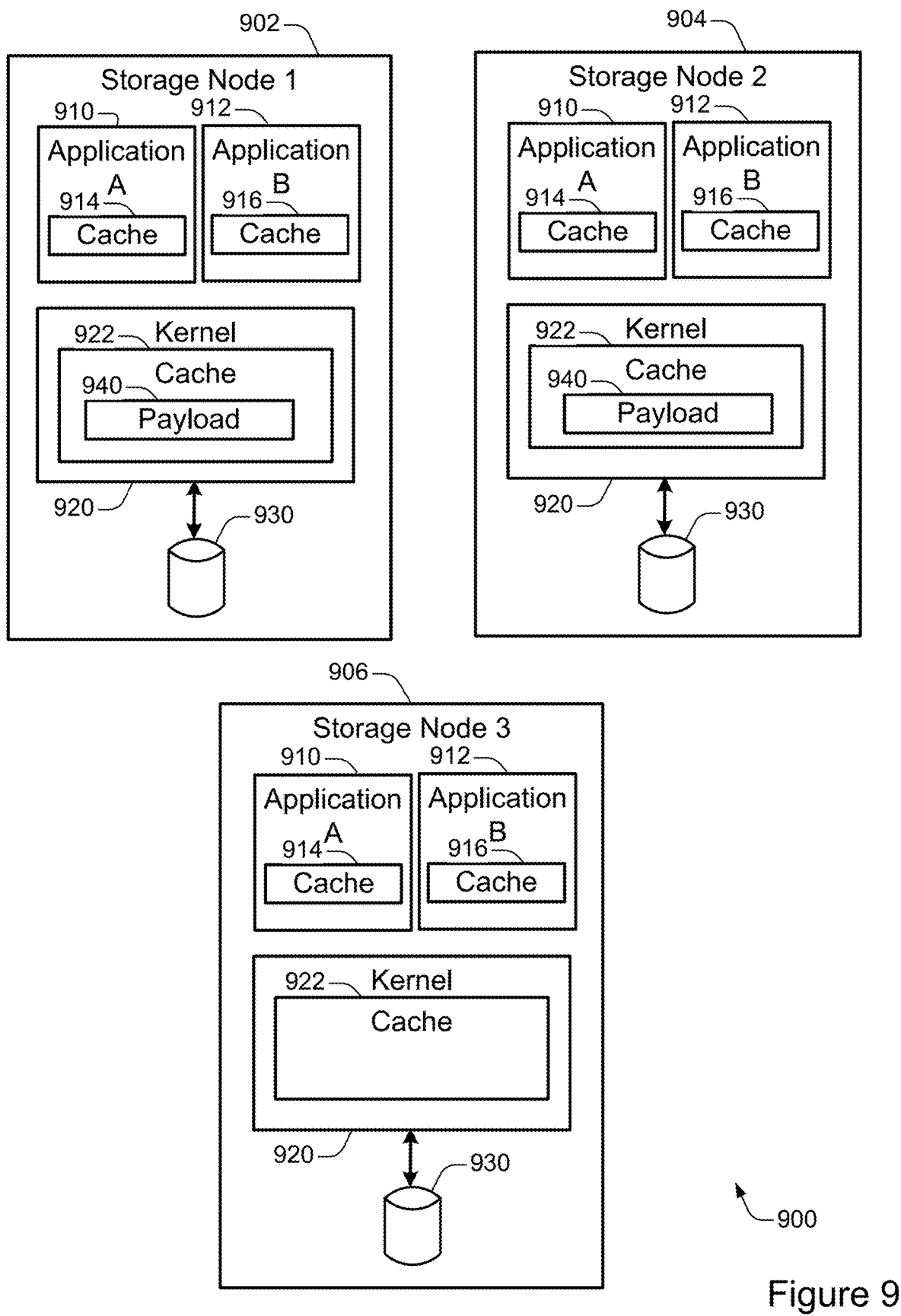
FIG. 9 illustrates an example of a storage node cluster configured for optimized synchronous workloads, in accordance with one or more embodiments.

Given the architecture presented above, users can optimize synchronous workloads by taking advantage of multiple replicas across different fault domains. FIG. 9 illustrates an example of a storage node cluster configured for optimized synchronous workloads, in accordance with one or more embodiments. FIG. 9 shows cluster 900 with storage nodes 902, 904, and 906. In some embodiments, cluster 900 may have many other storage nodes in the cluster, but only three are shown in FIG. 9. In addition, in some embodiments, each of storage nodes 902, 904, and 906 sits on different fault domains. Thus, a failure in one of the nodes, does not affect the other nodes.

FIG. 9 also depicts each storage node including multiple applications 910 and 912. Each application includes its own application cache 914 or 916. In addition, each storage node also includes its own kernel 920, as well as its own kernel cache 922. Each node also includes persistent storage 930, to which data, or payload 940, is flushed from kernel cache 922. With the architecture presented in FIG. 9, the system can optimize synchronous workloads.

Figure 10:
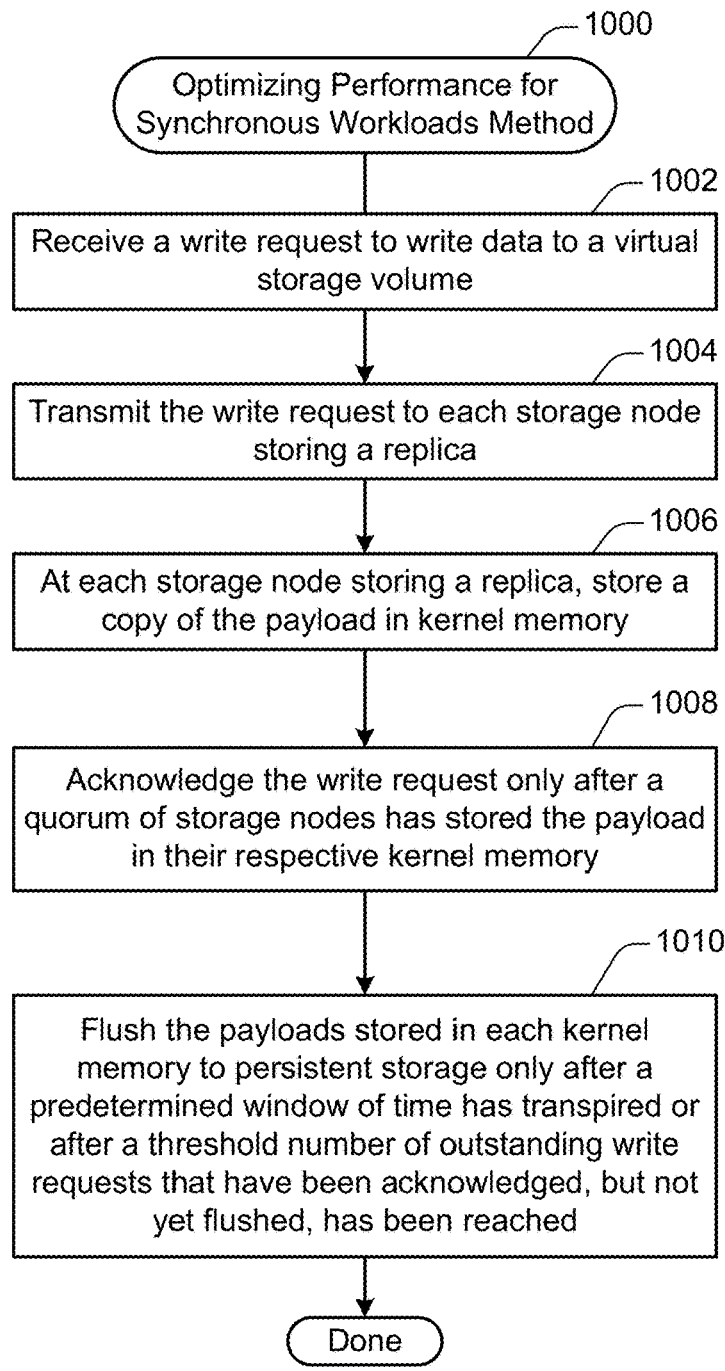
FIG. 10 illustrates an example of a method for optimizing performance for synchronous workloads, performed in accordance with one or more embodiments.

FIG. 10 illustrates an example of a method for optimizing performance for synchronous workloads, performed in accordance with one or more embodiments. Method 1000 begins at step 1002 with receiving a write request to write data to a virtual storage volume. In some embodiments, the virtual storage volume has a plurality of replicas. In some embodiments, each replica is stored on a storage node corresponding to a different fault domain across a plurality of storage nodes in a storage node cluster. For example, one replica may be stored on each of storage node 902, 904, and 906. In some embodiments, the write request is received at a server, compute node, or a storage node.

In some embodiments, each storage node includes one or more storage pools for storing data corresponding to the virtual storage volume. In some embodiments, each storage pool corresponds to one or more storage devices having storage space allocated for storing the data. In some embodiments, the write request includes a payload, such as payload 940. In some embodiments, the write request to write data is a synchronous write operation. In some embodiments, the synchronous write operation is first decomposed into an asynchronous write operation and a separate flush operation before being sent to replica nodes.

At 1004, method 1000 includes transmitting the write request to each storage node storing a replica. At 1006, method 1000 includes, at each storage node storing a replica, storing a copy of the payload in kernel memory. For example, payload 940 is stored in kernel cache 920 on nodes 902 and 904. In some embodiments, kernel cache is much more reliable than application cache because an application cache can disappear when the application ends, stops, or reboots. However, kernel cache only fails when the whole machine fails. Thus, payloads that are stored in kernel memory are afforded a higher level of protection from failure.

At 1008, the write request is acknowledged only after a quorum of storage nodes has stored the payload in their respective kernel memory. In some embodiments, a quorum is just a simple majority of the nodes. For example, in FIG. 9, a quorum is reached because storage nodes 902 and 904 have payload 940 stored in kernel cache 922, even though node 906 does not yet have payload 940 stored in kernel cache. In some embodiments, write operations are acknowledged only after all storage nodes store the payload in kernel memory. In some embodiments, each replica node first sends a notification back to the server, compute node, or storage node once the payload is stored in kernel memory.

Last, at 1010, the payloads stored in each kernel memory are flushed to persistent storage only after a predetermined window of time has transpired or after a threshold number of outstanding write requests that have been acknowledged, but not yet flushed, has been reached. For example, payloads 940 are flushed to persistent storage 930 after set amount of time or if the number of outstanding write operations exceeds a threshold. In some embodiments, a timer is set with the predetermined window of time and automatically resets after the timer expires. In such embodiments, the predetermined window of time restarts again automatically after time has run out. In some embodiments, the predetermined window of time is adjustable but has a default window size of 50 milliseconds. In some embodiments, the server, compute node, or storage node that received the request sends the flush operation to the replica nodes.

In some embodiments, a counter is incremented every time a new write request is received and acknowledged. In such embodiments, the counter corresponds to the number of outstanding write requests that have been acknowledged but have yet to be flushed. In some embodiments, the number of outstanding write requests can grow very large without the timer or window expiring. This can be problematic if all replica nodes do indeed fail within the window, especially if the window is large. Thus, in some embodiments, once the counter reaches a predetermined threshold value, then the outstanding write operations, that were acknowledged but not yet flushed, are then subsequently flushed to persistent storage, regardless of the window.

Although the timer and counter threshold are designed to reduce the risk of data loss in the event of a node failure, node failures can still occur. In some embodiments, if at least one node has not failed, then data can be recovered from the surviving replica node and sent to all the rest of the failed nodes.

In rare instances, where all nodes failed within the timer window, then in some embodiments, local recovery is performed on all replicas such that all replicas are consistent, even though unflushed payloads in kernel memory are lost. In some embodiments, to prevent against total node failure, a failsafe mechanism kicks in as soon as a single node goes offline. In such embodiments, if one storage node storing a replica fails, then all write requests are flushed to persistent storage as soon as they are acknowledged regardless of whether the predetermined amount of time has transpired. Any new write operations received are treated as synchronous write operations where the write operation is flushed to persistent storage immediately after being transmitted to replica nodes.

In some embodiments, another alternative is to maintain replica logs on a journal device. In addition, in such embodiments, each replica node would maintain its own flush operation timer. In other words, no flush operation is sent from a main node/server to other replica nodes. In the event of a failure, any recovery, if needed, would be performed using the journal device by using the most recent write operation seen by any of the replica nodes until all replica nodes match.

The techniques and the mechanisms presented herein provide for a way to optimize synchronous workloads in a distributed storage system. By limiting costly sync/flush operations to only timer window flushes, computer systems and servers can operate and perform much more efficiently.

Figure 11:
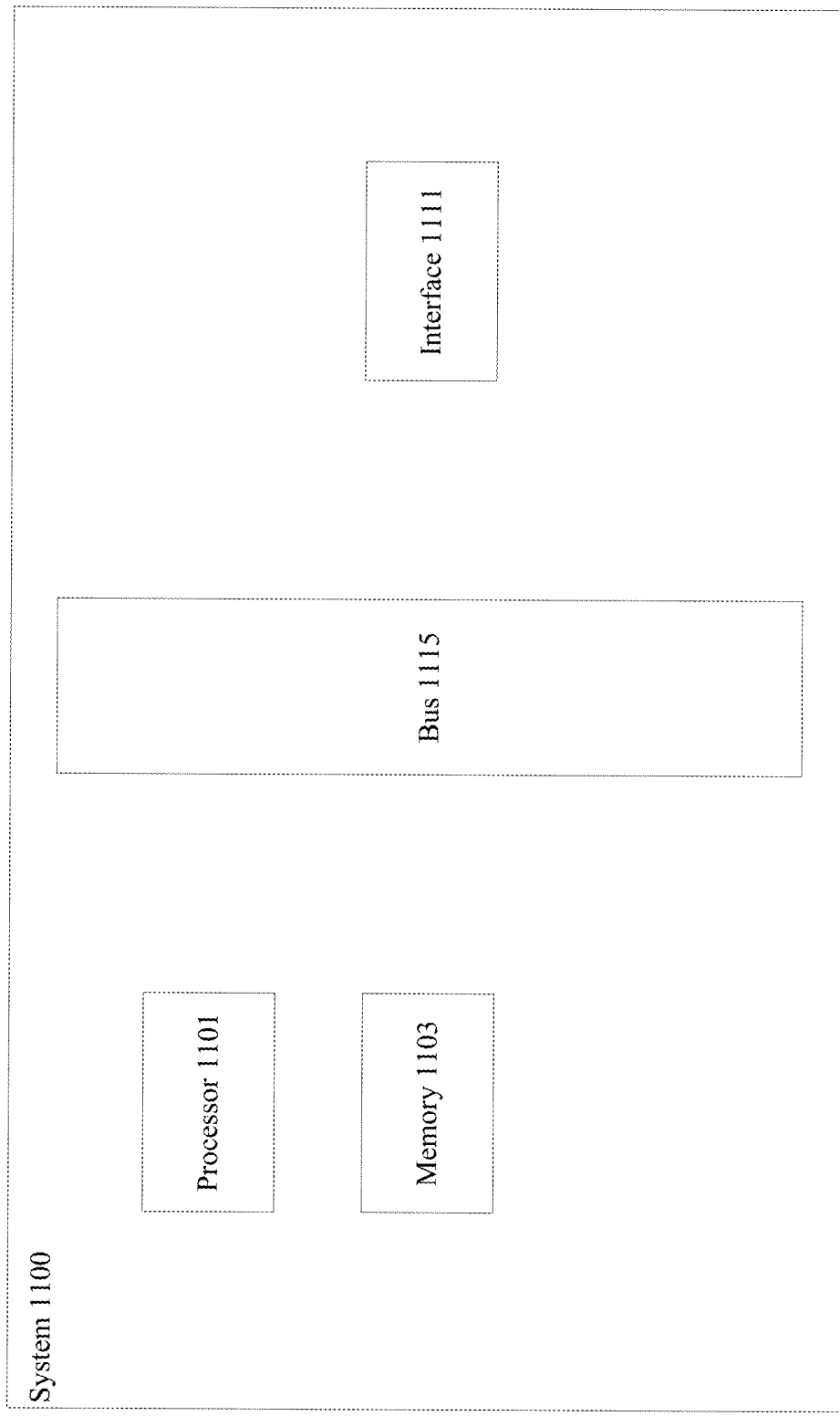
FIG. 11 illustrates an example of a server, configured in accordance with one or more embodiments.

FIG. 11 illustrates one example of a server. According to particular embodiments, a system 1100 suitable for implementing particular embodiments of the present disclosure includes a processor 1101, a memory 1103, an interface 1111, and a bus 1115 (e.g., a PCI bus or other interconnection fabric) and operates as a container node. When acting under the control of appropriate software or firmware, the processor 1101 is responsible for implementing applications such as an operating system kernel, a containerized storage driver, and one or more applications. Various specially configured devices can also be used in place of a processor 1101 or in addition to processor 1101. The interface 1111 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1100 is a server configured to run a container engine and/or a storage container node as shown herein. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the disclosure has been described with reference to specific embodiments. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure.

What is claimed is:

1. A method for optimizing performance for synchronous workloads, the method comprising:
    receiving a write request to write data to a virtual storage volume, the virtual storage volume having a plurality of replicas, each replica being stored on a storage node corresponding to a different fault domain across a plurality of storage nodes in a storage node cluster, each storage node including one or more storage pools for storing data corresponding to the virtual storage volume, each storage pool corresponding to one or more storage devices having storage space allocated for storing the data, wherein the write request includes a payload;
    transmitting the write request to each storage node storing a replica;
    at each storage node storing a replica, storing a copy of the payload in kernel memory;
    acknowledging the write request only after a quorum of storage nodes has stored the payload in their respective kernel memory; and
    flushing the payloads stored in each kernel memory to persistent storage only after a threshold number of outstanding write requests that have been acknowledged, but not yet flushed, has been reached, the flushing configured to optimize the performance for the synchronous workloads.

2. The method recited in claim 1, wherein the request to write data is a synchronous write operation.

3. The method recited in claim 2, wherein the synchronous write operation is decomposed into an asynchronous write operation and a separate flush operation.

4. The method recited in claim 1, wherein the flushing is performed only after a predetermined window of time has transpired.

5. The method recited in claim 4, wherein if one storage node storing a replica fails, then all write requests are flushed to persistent storage as soon as they are acknowledged regardless of whether the predetermined window of time has transpired.

6. The method recited in claim 4, wherein the predetermined window of time is adjustable but has a default window size of 50 milliseconds.

7. The method recited in claim 1, wherein a counter is incremented every time a new write request is received and acknowledged, the counter corresponding to the number of outstanding write requests that have been acknowledged but have yet to be flushed.

8. A system comprising:
    a storage node cluster, the storage node cluster including a plurality of storage nodes across a plurality of different fault domains, each storage node including one or more storage pools for storing data corresponding to a virtual storage volume, the storage volume having a plurality of replicas, each replica being stored on a storage node corresponding to a different fault domain, each storage pool corresponding to one or more storage devices having storage space allocated for storing the data;
    a network interface configured to receive write requests and to facilitate communication between storage nodes across the storage node cluster; and
    a processor configured for:
        receiving a write request to write data to the virtual storage volume, wherein the write request includes a payload;
        transmitting the write request to each storage node storing a replica;
        at each storage node storing a replica, storing a copy of the payload in kernel memory;
        acknowledging the write request only after a quorum of storage nodes has stored the payload in their respective kernel memory; and
        flushing the payloads stored in each kernel memory to persistent storage only after a threshold number of outstanding write requests that have been acknowledged, but not yet flushed, has been reached, the flushing configured to optimize performance of synchronous workloads.

9. The system recited in claim 8, wherein the request to write data is a synchronous write operation.

10. The system recited in claim 9, wherein the synchronous write operation is decomposed into an asynchronous write operation and a separate flush operation.

11. The system recited in claim 8, wherein the flushing is performed only after a predetermined window of time has transpired.

12. The system recited in claim 11, wherein if one storage node storing a replica fails, then all write requests are flushed to persistent storage as soon as they are acknowledged regardless of whether the predetermined window of time has transpired.

13. The system recited in claim 11, wherein the predetermined window of time is adjustable but has a default window size of 50 milliseconds.

14. The system recited in claim 8, wherein a counter is incremented every time a new write request is received and acknowledged, the counter corresponding to the number of outstanding write requests that have been acknowledged but have yet to be flushed.

15. One or more non-transitory machine-readable media having instructions stored thereon for performing a method, the method comprising:
receiving a write request to write data to a virtual storage volume, the virtual storage volume having a plurality of replicas, each replica being stored on a storage node corresponding to a different fault domain across a plurality of storage nodes in a storage node cluster, each storage node including one or more storage pools for storing data corresponding to the virtual storage volume, each storage pool corresponding to one or more storage devices having storage space allocated for storing the data, wherein the write request includes a payload;
transmitting the write request to each storage node storing a replica;
at each storage node storing a replica, storing a copy of the payload in kernel memory;
acknowledging the write request only after a quorum of storage nodes has stored the payload in their respective kernel memory; and
flushing the payloads stored in each kernel memory to persistent storage only after a threshold number of outstanding write requests that have been acknowledged, but not yet flushed, has been reached, the flushing configured to optimize performance of synchronous workloads.

16. The one or more non-transitory machine-readable media recited in claim 15, wherein the request to write data is a synchronous write operation.

17. The one or more non-transitory machine-readable media recited in claim 16, wherein the synchronous write operation is decomposed into an asynchronous write operation and a separate flush operation.

18. The one or more non-transitory machine-readable media recited in claim 15, wherein the flushing is performed only after a predetermined window of time has transpired.

19. The one or more non-transitory machine-readable media recited in claim 18, wherein if one storage node storing a replica fails, then all write requests are flushed to persistent storage as soon as they are acknowledged regardless of whether the predetermined window of time has transpired.

20. The one or more non-transitory machine-readable media recited in claim 15, wherein a counter is incremented every time a new write request is received and acknowledged, the counter corresponding to the number of outstanding write requests that have been acknowledged but have yet to be flushed.

* * * * *